(No Model.) 2 Sheets—Sheet 1.

W. O. BATES & W. J. HUTCHINS.
ELECTRIC BALE TIE MACHINE.

No. 587,296. Patented Aug. 3, 1897.

Witnesses.

Inventors.
William O. Bates
William J. Hutchins

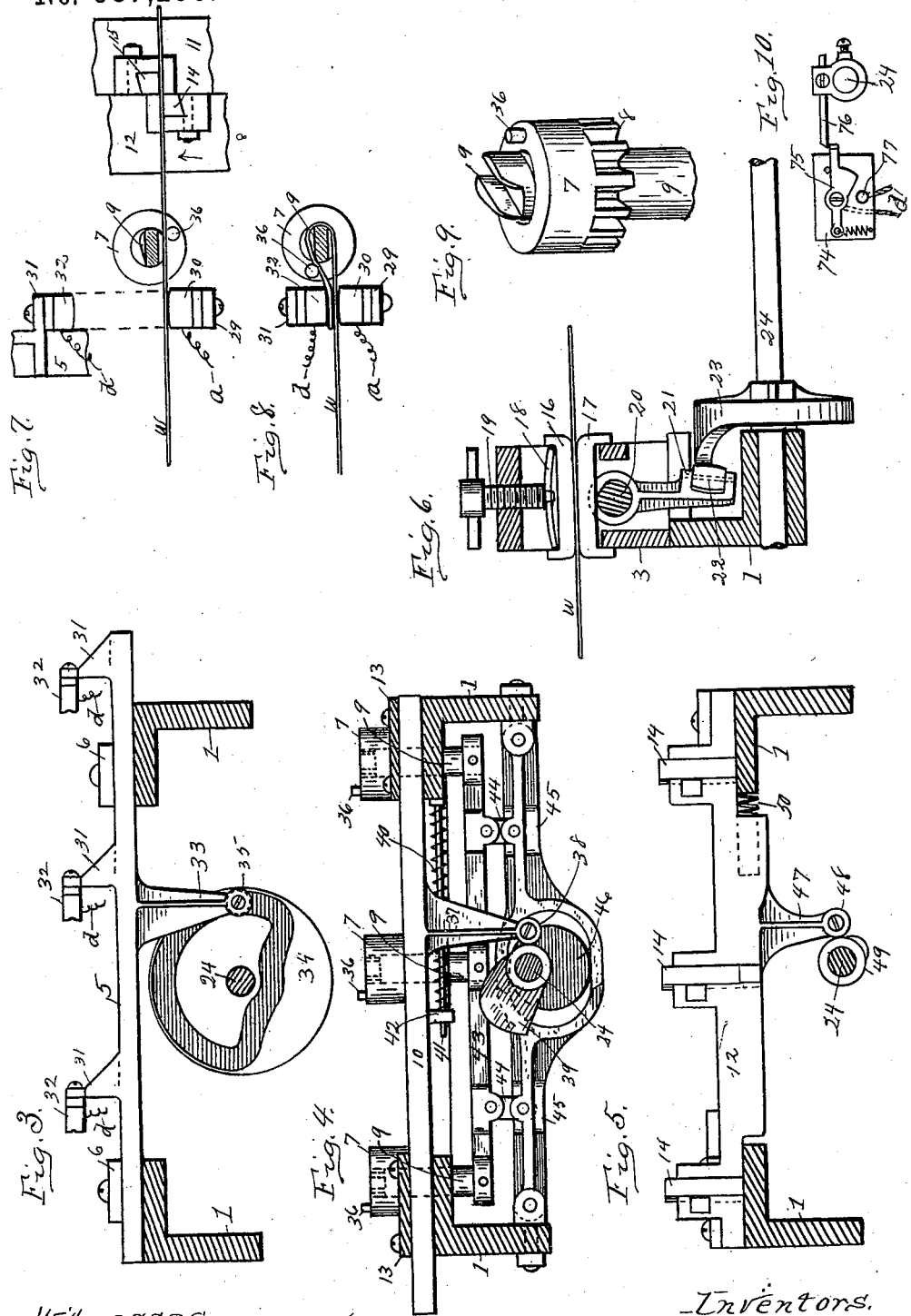

UNITED STATES PATENT OFFICE.

WILLIAM O. BATES AND WILLIAM J. HUTCHINS, OF JOLIET, ILLINOIS.

ELECTRIC BALE-TIE MACHINE.

SPECIFICATION forming part of Letters Patent No. 587,296, dated August 3, 1897.

Application filed March 8, 1897. Serial No. 626,543. (No model.)

*To all whom it may concern:*

Be it known that we, WILLIAM O. BATES and WILLIAM J. HUTCHINS, citizens of the United States of America, residing at Joliet, in the county of Will and State of Illinois, have invented certain new and useful Improvements in Electric Bale-Tie Machines, of which the following is a specification, reference being had therein to the accompanying drawings, and the letters and figures of reference thereon, forming a part of this specification, in which—

Figure 1:
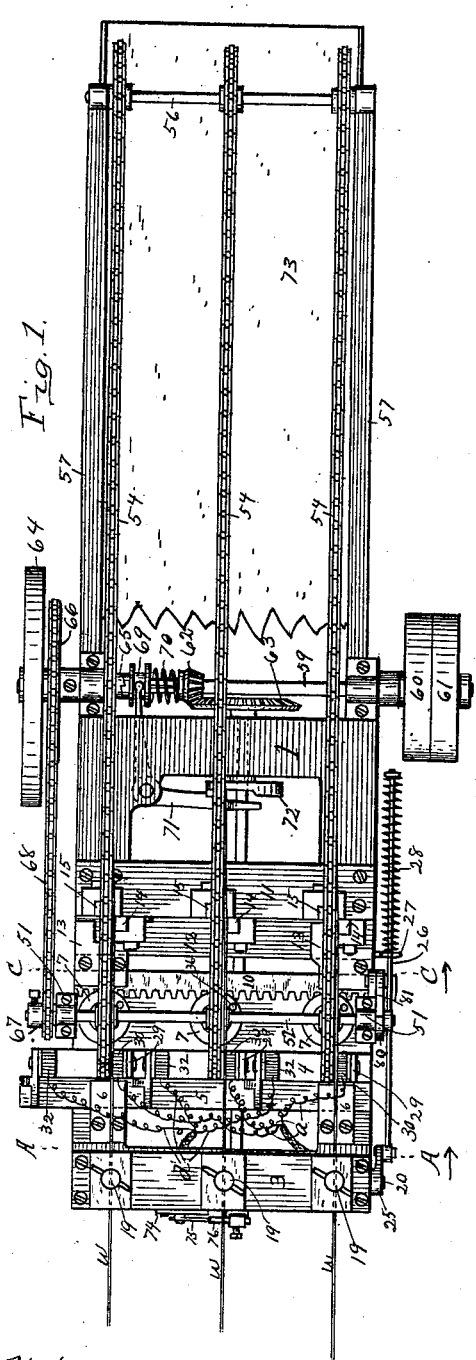
Figure 2:
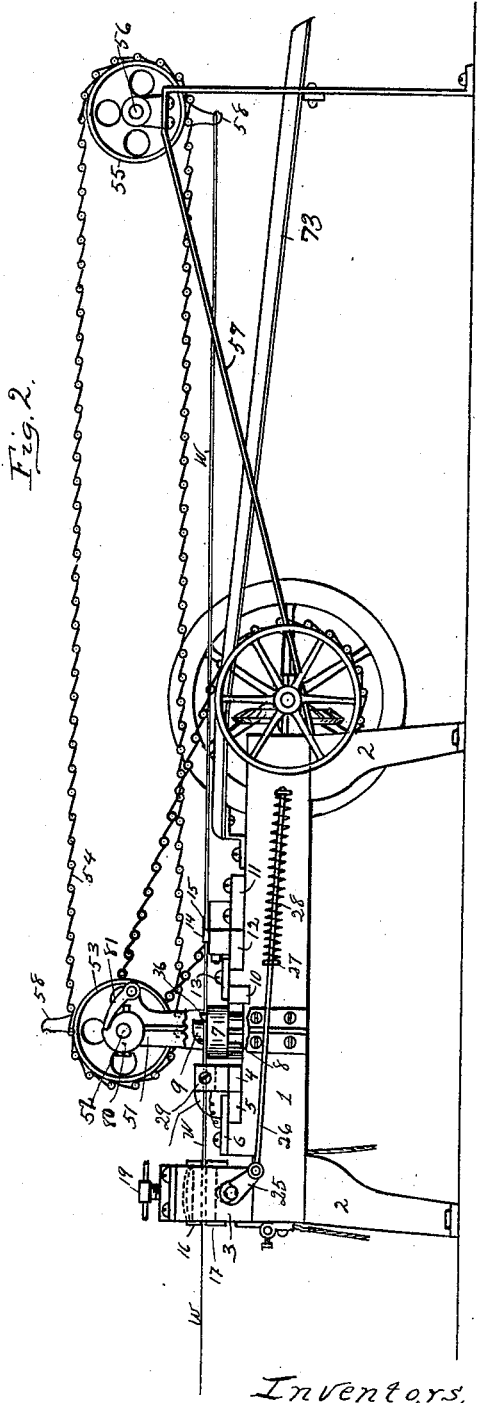

Figure 1 is a plan of the machine; Fig. 2, a side elevation of the same. Figs. 3, 4, and 5 are cross-sectional views of the machine, the former view being taken on line A A of Fig. 1 and the latter view being taken on line C C of said figure; Fig. 6, a central longitudinal sectional view of one end portion of the machine, showing the wire-tension device; Fig. 7, a detailed plan of the wire-cutting, loop-bending, and electrode mechanism of one section of the machine, showing the relative position of the wire thereto; Fig. 8, a similar view omitting the cutters and showing the manner of bending the wire loop; Fig. 9, a detailed perspective of one of the wire-loop-bending devices of the machine, and Fig. 10 a detailed plan of an electric-switch device employed in making and breaking the electric circuit connecting the machine.

This invention relates to certain improvements in machines for the manufacture of bale-ties, and relates essentially to machines wherein electric welding is employed; and it consists in mechanism for advancing one or more wires in the process of making bale-ties for stretching and thereby straightening and testing the wire or wires, for severing the wire or wires into suitable lengths, for bending a loop or loops on the end of the wire or wires, and for grasping the coinciding parts of the loop wire or wires by means of electrodes during a period of time sufficient to electrically weld said coinciding wire parts together, which features are fully set forth and explained in the following specification and pointed out in the hereunto-annexed claims.

The object of this invention is to provide automatic machinery for the manufacture of bale-ties whereby the tie-loops are made by electrically welding their coinciding parts, thereby avoiding the necessity of twisting said coinciding parts together, as has heretofore been the common practice.

Referring to the accompanying drawings, 1 is the machine-bed, mounted on standards 2.

3 is a housing mounted on one end of the bed and divided into compartments equal to the number of wires brought into the machine, in each compartment of which is placed a pair of wire-contacting tension-blocks 16 17, upon the upper one of which blocks is placed a spring-plate 18, arranged to be engaged by a downturned tension-regulating screw 19. The lower block rests upon a cross-shaft 20, which is made with one flattened side and boxed at its end portions in said housing in such manner that when turned with its flattened side up the blocks 17 are permitted to lower a short distance, and when turned otherwise said blocks will be raised their full limit, and as a means of actuating said cross-shaft a down-extending arm 21, having an anti-friction-roller 22, is attached thereto and arranged to be engaged against its roller by a cam 23, which is fixed on and operated by a longitudinal shaft 24, boxed to the under side of bed 1, which cam is of such form as to actuate arm 21 in one direction, so as to rock shaft 20 to raise blocks 17 a short period of time during each revolution of shaft 24, (see Fig. 6,) and as a means of reversely actuating said arm a second arm 25 is attached to one end of shaft 20, to which is attached a rod 26, arranged operating through an eye 27, attached to the side of bed 1 (see Fig. 2) and having a pressure coil-spring 28 sleeved thereon, which spring serves to yieldingly hold arm 21 against cam 23, and hence reversely actuates arm 21 when the cam so permits.

A little distance from housing 3 is a cross-bar 4, fixed upon bed 1 and made with upright arms 29, to which electrodes 30 are attached, which electrodes are of equal number and arranged in line with the tension-blocks 16 17. Arranged in a guideway at one side of bar 4 is a transverse sliding bar 5, held by means of keepers 6 and having upright and side overreaching arms 31, to which are attached electrodes 32, which are equal in number and arranged to be brought to register with electrodes 30, and as a means of operating said bar 5 a side-channeled cam 34, fixed on shaft 24, is arranged to receive in its channel a wrist-roller 35 of a depending arm 33 of said bar, which cam-channel is of such form as to intermittently operate electrodes 32 to and from electrodes 30.

7 represents wire-bending sleeves equal in number to the pairs of electrodes and made with annular gear-teeth 8, sleeved upon pins 9 and arranged resting upon bed 1 in such manner that a transversely-operating toothed rack 10, meshed therewith, will oscillate them jointly, so that by means of wire-bending pins 36, set in their upper end, the end portion of wires brought across their top between pins 9 and 36 (see Fig. 7) will be bent about pins 9 and 36, (see Fig. 8,) so as to form the loops on the wire ends, and as a means of operating said rack it is provided with a depending arm 37, having a wrist-roller 38, arranged to be engaged by a cam 39, fixed on shaft 24, (see Fig. 4,) which operates the rack in one direction, and a coil-spring 40, sleeved on a rod 41, attached to bed 1 at one end and placed through a depending eye-lug 42 of said rack, operates the rack in the opposite direction to return the bending-pins after a bend has been made. (See Fig. 4.)

The several pins 9 are arranged in vertical holes and are connected together at their lower end by means of a cross-bar 43, so they may be operated vertically jointly to lower (see Fig. 4) after the formation of the loops and be raised again to be in readiness for the formation of the next succeeding loops, and as a means of thus operating them their bar 43 is connected by means of links 44 with levers 45, which are fulcrumed at one end to bed 1 and jointly forked at their opposite end over a cam 46, fixed on shaft 24.

11 is a cross-bar fixed upon bed 1, and has set therein a plurality of wire-cutters 15, and 12 is a similar but transversely-operating bar having a like number of cutters 14, arranged to shear with cutters 15, and is arranged in a transverse guideway of the bed at one side of bar 11 and confined by means of keepers 13, which also confine rack 10, and as a means of operating said bar it is provided with a depending arm 47, having a wrist-roller 48, arranged to be engaged by a cam 49, fixed on shaft 24, which operates the bar in one direction, and a spring 50, set in a barrel of the bar and impinging against the bed 1, serves to reversely operate it.

Fixed to the sides of bed 1 is a pair of standard shaft-bearings 51, supporting a cross-shaft 52 above sleeves 7, and which has fixed thereon a series of chain-wheels 53, about which are arranged chains 54, which chains also pass about idler-wheels 55, fixed on a second cross-shaft 56, which is supported in bearings of an extension-frame 57, as shown. Chains 54 are so operated as to make one-half complete travel during one-half revolution of shaft 24 and remain idle during the remaining one-half revolution of said shaft, and are provided with fingers 58, which when operated move down and across sleeves 7 and wipe through the forked end of pins 9, and in so doing hook into the finished loops and draw them from the said sleeves and also advance them a distance equal to the length of a bale-tie, and hence draw the wires $w$, through the tension-blocks 16 17, across the sleeves 7, between the bending-pins 36 and pins 9 (which have been operated to lower to permit the wire to dislodge from their forks and again been raised) and between the cutters 14 15. During the major portion of such travel the tension-blocks hold the wires $w$ lightly, but near the conclusion of said travel the tension-blocks 17 are raised (by means of the mechanism described) and grip the wires firmly, which permits of a heavy pull on the wires, sufficient to slightly stretch them, and hence test their strength and straighten them.

59 is a cross-shaft boxed to one end of bed 1, as shown, and has placed on one end tight and loose belt-pulleys 60 61, on its center portion a bevel-pinion 62, and on its opposite end a fly-wheel 64. Fixed on shaft 24 is a bevel gear-wheel 63, arranged in mesh with and driven by pinion 62. Placed on one end of shaft 59, adjacent to the wheel 64, is a sleeve 65, clutched at its inner end, and has fixed on its outer end a sprocket-wheel 66, which drives a sprocket-wheel 67 of shaft 52 by means of a chain belt 68, and feathered on shaft 59 is a clutch-head 69, yieldingly held in engagement with the clutch of sleeve 65 by means of a coil-spring 70, sleeved on shaft 59, as shown.

71 is a lever fulcrumed to bed 1 and forked in the annular groove of clutch-head 69 at one end and operated to throw said clutch-head at the conclusion of each one-half travel of chains 54 by means of a cam 72, fixed on shaft 24, as shown in Fig. 1.

Arranged below chains 54 is an inclined table 73, for the purpose of catching the bale-ties as they fall from the fingers 58 of said chains.

In operation the wires $w$ are placed in between tension-blocks 16 17 and their ends pulled through and hooked on the chain-fingers 58 when the machine is started into operation, causing the wires to be drawn their full limit, stretched, and straightened, after which the time of the machine is such that the bending-sleeves 7 are started in operation, bringing their bending-pins 36 against the wires, when at that instant the cutters 14 are caused to quickly operate and sever the wires at that junction which liberates the wire portions beyond the cutters and formerly held by the chain-fingers, permitting them to fall upon table 73, and in the process of operating the machine such liberated wire portions are finished bale-ties. Following said cutting operation the bending-pins 36 continue their operation, bending the severed ends of the wires about pins 9 so as to bring their end portions to coincide with the wire body adjacent to electrodes 30, when electrodes 32 are advanced and grip said coinciding wire parts, and during the time of said grip the electric current is applied to make the welds to unite said coinciding wire parts and thus complete the formation of the loops, after which the chains are operated to cause their fingers 58 to move down and about and wipe through the forked end of pins 9 and strip the loops therefrom and advance the wires in the machine the length of a bale-tie, as stated.

$a$ represents the electric conductors or wires arranged connecting electrodes 30, and $d$ the conductors or wires arranged connecting the electrodes 32, which conductors are of the same circuit, and when said electrodes are separated the circuit is broken at that junction and made at the same junction when the said electrodes are brought to grasp the wires, so the current passes through and fuses the wires sufficiently to weld them together, and intersecting conductors $d$ a switchboard 74 is placed, which is so constructed that its lever 75 is yieldingly held to break the circuit at that station, and fixed to the end of shaft 24 is a hub adjustably holding a finger 76 in such manner that at each revolution of the shaft said finger will engage the switch-lever 75 and throw it to register with the binding-post 77, and thus make the circuit at that station, which is done while the electrodes are holding the wires in grip. The purpose of adjusting finger 76 is to adapt it to hold the lever 75 thrown a greater or less period of time to regulate the duration of time the electric current shall be applied in the act of welding.

Shaft 52 has fixed on one end thereof a notched disk 80, and the adjacent standard 51 has pivoted thereto a pawl 81, arranged to engage the notch of said disk for the purpose of retaining the full movement of the traveling chains and preventing back travel thereof when their driving-clutch is thrown.

Having thus described our invention, what we claim as new and useful, and desire to secure by Letters Patent, is as follows:

1. In a machine for the manufacture of bale-ties, means for supporting and intermittently advancing one or more wires; means for severing the wire or wires into suitable lengths; means for bending the wire end or ends to form a loop or loops thereon; and electrodes arranged to grasp the coinciding wire parts of the loop or loops during a period of time sufficient to electrically weld said coinciding parts together, substantially as set forth.

2. In a machine for the manufacture of bale-ties, a tension device through which a plurality of wires are drawn; a multiple of wire-bending devices arranged to engage and bend the wire ends to form loops thereon; electrodes arranged to contact the coinciding wire parts of said loops during the period of time an electric current is applied to weld said coinciding parts together; a multiple of intermittent traveling devices arranged to engage with said loops and draw the wires through said tension device and advance the same in the machine; and a multiple of devices arranged to sever the advanced wire portions into lengths suitable for bale-ties, substantially as set forth.

3. In an electric welding-machine, means for supporting one or more wires; means for bending the end portion of the wire or wires to form a loop or loops thereon, and electrodes arranged to grasp the coinciding wire portions of the loop or loops during the period of time the electric current is applied to weld said coinciding portions together, substantially as set forth.

4. In an electric welding bale-tie machine; the plurality of loop-bending devices; the intermittently-traveling wire-advancing devices; the plurality of wire-tension devices actuated to exert a variable tension, whereby normal tension is maintained during the major portion of the travel of the wires, and an increased tension is exerted during the terminal portion of said travel; and a plurality of wire-cutting devices, substantially as and for the purpose specified.

5. In the machine described, the wire-tension device comprising the housing; the pairs of wire-clamping blocks; the spring-plates arranged upon the upper ones of said blocks; the tension-regulating screws; and the cross-shaft arranged under the lower ones of said blocks and adapted to be turned to raise and lower said blocks, substantially as and for the purpose set forth.

6. In the machine described, the stationary cross-bar having the series of upright arms provided with the stationary electrodes; the transversely-operating bar having the series of upright overreaching arms provided with the operative electrodes; and means for intermittently operating said bar and electrodes, substantially as and for the purpose specified.

7. In the machine described, the vertically-operative pins forked at their upper end; the wire-bending sleeves placed on said pins and provided with the wire-bending pin and with the gear-teeth; the transversely-operating rack arranged jointly in mesh with said gears; and means for operating said pins and rack in the manner substantially as and for the purpose specified.

8. In the machine described, in combination with the plurality of wire-bending sleeves, and forked pins about which said sleeves operate; the plurality of intermittently-traveling chains provided with the extending fingers adapted in their travel to wipe through the forks of said pins, substantially as and for the purpose specified.

9. In the machine described, in combination with the driving mechanism, and the traveling wire-pulling chains; the interposed clutch-and-lever mechanism; the cam arranged to actuate said mechanism to intermittently drive said wire-pulling chains, and the stop device for preventing back travel of said chains, substantially as set forth.

WILLIAM O. BATES.
WILLIAM J. HUTCHINS.

In presence of—
FREDERICK M. KER,
THOMAS J. COOKSON.